United States Patent
Ramadan

(10) Patent No.: US 7,212,712 B2
(45) Date of Patent: May 1, 2007

(54) COUPLER-MULTIPLEXER PERMUTATION SWITCH

(75) Inventor: Tarek A. Ramadan, Cairo (EG)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/838,862

(22) Filed: Apr. 20, 2001

(65) Prior Publication Data

US 2004/0208447 A1 Oct. 21, 2004

(51) Int. Cl.
*G02B 6/293* (2006.01)
*G02B 6/34* (2006.01)
*H04J 14/02* (2006.01)

(52) U.S. Cl. .............................. 385/50; 385/18; 385/37; 385/50; 398/87

(58) Field of Classification Search ................... 385/28, 385/37, 50, 18, 20–23; 398/68, 82–88
See application file for complete search history.

(56) References Cited

U.S. PATENT DOCUMENTS

| | | | | | |
|---|---|---|---|---|---|
| 5,684,899 | A | * | 11/1997 | Ota ............................. | 385/24 |
| 5,724,463 | A | * | 3/1998 | Deacon et al. ................ | 385/27 |
| 5,911,018 | A | * | 6/1999 | Bischel et al. ................ | 385/16 |
| 5,937,113 | A | * | 8/1999 | He et al. ....................... | 385/11 |
| 6,571,031 | B1 | * | 5/2003 | Augustsson .................. | 385/24 |
| 6,657,723 | B2 | * | 12/2003 | Cohen et al. ................ | 356/328 |

OTHER PUBLICATIONS

T.A. Ramadan et al., "A Novel 1×4 Coupler-Multiplexer Permutation Switch for WDM Applications", J. Lightwave Technol., vol. 18, No. 4, pp. 579–588, 2000.

Y. Tachikawa et al., "Arrayed–Wavelength Grating Multiplexers with loop–back optical paths and its applications", J. Lightwave Tech., vol. 14, pp. 97–84, 1996.

O. Ishida et al., "Digitally Tunable Optical Filters using Array–Waveguide grating (AWG) Multiplexers and Optical Switches", J. Lightwave Tech., vol. 15, pp. 321–327, 1997.

A. A. M. Staring et al., "Phased–Array–Based Photonic Integrated Circuits for Wavelength Division Multiplexing Applications", ICICE Trans. Electron., vol. E80–C, pp. 646–653, 1997.

B. Mukherjee, "Optical Communications Networks", McGraw Hill, 1997, pp. xi–xx.

G.P. Agrawal, "Fiber Optic Communication Systems", John Wiley & Sons, 1997, pp ix–xv.

L. Kazovsky et al., "Optical Fiber Communication Systems", Artech House, 1996, pp vi–xiii.

T.E. Stern and K. Bala, "Multiwavelength Lightwave Optical Networks: A Layered Approach", Addison–Wesely, 1999, pp. vii–xiii.

R. Ramaswamy, "Multiwavelength Lightwave Networks for Computer Communication", IEEE Comm. Mag., vol. 31, No. 2, pp. 78–88, 1993.

(Continued)

*Primary Examiner*—Michelle Connelly-Cushwa
*Assistant Examiner*—Jerry T Rahll
(74) *Attorney, Agent, or Firm*—Baker Botts LLP

(57) ABSTRACT

A coupler-multiplexer permutation switch (CMPS) integrates multiplexng and switching functions on a single substrate. It has a single-mode/multi-mode backward coupler followed by a digital optical switch (DOS). In the CMPS, the single-mode waveguide channels are phase-matched through a grating with the corresponding, backward-propagating modes of a multi-mode waveguide. The different modes are subsequently separated in a digital optical switch. Different permutations are obtained by electronically controlling an effective-index distribution of DOS output waveguides.

20 Claims, 6 Drawing Sheets

OTHER PUBLICATIONS

F. Forghieri et al., "Reduction for four-wave-mixing crosstalk in WDM Systems using unequally spaced channels", IEEE Photon. Technol. Lett., vol. 6, pp. 754–756, 1994.

F. Forghieri et al., "WDM Systems with unequally spaced channels", J. Lightwave Technol., vol. 13, pp. 889–897, 1995.

H. Okayama et al., "Multiwavelength highway photonic switches using wavelength-sorting elements-design", J. Lightwave Technol., vol. 15, pp. 607–615, 1997.

G. Chang et al., "Multiwavelength reconfigurable WDM/ATM/SONET network testbed", J. Lightwave Technol., vol. 14, pp. 1320–1340, 1996.

J.L. Jackel et al., "Acousto-optic tunable filters (AOTF's) for multiwavelength optical cross-connects: crosstalk considerations", J. Lightwave, Technol., vol. 14, pp. 1056–1066, 1996.

D.A. Smith et al., "Evolution of the acousto-optic wavelength routing switch", J. Lightwave Techno.., vol. 14, pp. 1005–1019, 1996.

Y. Tachikawa et al., "Arrayed-waveguide grating multiplexers with loop-back optical paths and its applications", J. Light-wave Techno., vol. 14, pp. 977–984, 1996.

O. Ishida et al., "Digitally tunable optical filters using arrayed-waveguide grating (AWG) multiplexers and optical switches", J. Lightwave Technol., vol. 15, pp. 321–327, 1997.

B. Glance et al., "Applications of the integrated waveguide grating router", J. Light-wave Technol., vol. 12, pp. 957–962, 1994.

D.A.B. Miller et al., "Band-edge electroabsorption in quantum well structures: The quantum-confined Stark effect", Phys. Rev. Lett., vol. 53, pp. 2173–2176, 1984.

C.A. Brackett, "Forward–Is there an emerging consensus on WDM networking?", J. Light-wave Technol., vol. 14, pp. 936–941, 1996.

B.N. Thruston, E. Kapon, and Y. Silberberg, "Analysis of mode separation in multichannel branching waveguides", IEEE J. Quantum Electron. vol. QE–23; pp. 1245–1255; 1987.

G.J. Veldhuis, J.H. Brends, and P.V. Lambeck, "Design and characterization of a mode-splitting y- junction", J. Light-wave Technol., vol. 14, pp. 1746–1752, 1996.

Y. Silberberg, P. Perlmutter, and J.E. Baran, "Digital optical switch". Appl. Phys. Lett., vol. 51, pp. 1230–1232, 1987.

Hideaki Okayama and Masato Kawahara, "Reduction of voltage-length product for Y-branch digital optical switch", J. Light-wave Technol., vol. 11, pp. 379–387, 1993.

D. Marcuse, Theory of dielectric optical waveguides, 2nd Ed., Academic Press, 1991, pp. vii–ix.

D. Marcuse, "Bandwidth of forward and backward coupling directional couplers", J. Light-wave Technol., vol. LT–5, pp. 1773–1777, 1987.

D. Marcuse, "Directional Couplers made of nonidentical asymmetric slabs. Part II: Grating assisted couplers", J. Lightwave Technol., vol. LT–5, pp. 268–273, 1987.

H. Kogelnik, "Theory of optical waveguides", Ch.2 in: Guided-wave optoelectronics, Theodore Tamir (Ed.), Springer—Verlag, 1988.

R. Scarmozzino and R.M. Osgood, Jr., "Comparison of finite-difference and fourier-transform solutions of parabolic wave equation with emphasis on integrated-optics applications", J Opt. Soc. Amer. A, vol. 8, pp. 724–731, 1991.

G.R. Hadley, "Transparent boundary conditions for beam propagation method", IEEE J. Quantum Electron., vol. 28, pp. 363–370, 1992.

W.K. Burns and A.F. Milton, "Waveguide transitions and Junctions", Ch. 3 in: Guided-wave optoelectronics, Theodore Tamir (Ed.), Springer—Verlag, 1988.

W.K. Burns and A.F. Milton, "Mode conversion in planar-dielectric separating waveguides", IEEE J. Quantum Electron, vol. QE–11, pp. 32–39, 1975.

A.F. Milton and W.K. Burns, "Tapered velocity couplers for integrated optics: Design", Appl. Opt., vol. 14, pp. 1207–1212, 1975.

W. Wakita, Semiconductor optical modulators, Kluwer Academic Publishers, 1998, pp. vii–xi.

T.H. Wood, "Multiple quantum well (MQW) waveguide modulators", J. Lightwave Technol., vol. 6, pp. 743–757, 1988.

K. Kawano, K. Wakita, O. Mitomi, I. Kataka, and M. Naganuma, "Design of InGaAs–InAlAs multiple-quantum-well (MQW) optical modulators", IEEE J. Quantum Electron., vol., 28, pp. 224–230, 1992.

R.W. Martin, S.L. Wongt, R.J. Nicholas, K. Satzke, M. Gibbon, and E.J. Thrush, "The design of quantum-confined stark effect modulators for integration with 1.55 μm lasers", Semicond. Sci. Technol., vol. 8, pp. 1173–1178, 1993.

M. Cada, B.P. Keyworth, J.M. Glinski, A.J. SpringThrope, C. Rolland, and K.O. Hill, "Electro-optic switching in a p–i–n doped multiple quantum well directional coupler", J. Appl. Phys., vol. 69, pp. 1760–1762, 1991.

A. Stöhr, O. Humbach, S. Zumkley, G. Wingen, G. David, D. Jager, B. Ballig, E.C. Larkins, and J.D. Ralston, "InGaNs/GaAs multiple-quantumwell modulators and switches", Opt. Quantum Electron., vol. 25, pp. S865–S883, 1993.

J.E. Zucker, 1. Bar–Joseph, B.I. Miller, U. Koren, and D.S. Chemla, "Quaternary quantum wells for electro-optic intensity and phase modulation at 1.3 and 1.55 μm", Appl. Phys. Lett., vol. 54, pp. 10–12, 1989.

H.K. Tsang, J.B.D. Soole, H.P. LeBlanc, R. Bhat, and M.A. Koza, "Efficient InGaAsP/InP multiple quantum well waveguide optical phase modulator", Appl. Phys. Lett., vol. 57, pp. 2285–2287, 1990.

J.S. Weiner, D.A.B. Miller, and D.S. Chemla, "Quadratic electro-optic effect due to quantum-confined Stark effect in quantum wells", Appl. Phys. Lett., vol. 50, pp. 842–844, 1987.

M. Born and E. Wolf, Principles of Optics, 5th Ed., Pergamon, 1975, pp. xi–xx.

I.M. Skinner, R. Shail, and B.L. Weiss, "Modal propagation within MQW wave guides", IEEE J. Quantum Electron., vol. 25, pp. 6–11, 1989.

R.A. Sammut and I.M. Skinner, "Effective index models for MQW waveguides", Opt. Commun., vol. 76, pp. 213–216, 1990.

G.M. Alman, L.A. Molter, H. Shen, and M. Dutta, "Refractive index approximations from linear perturbation theory for planar MQW waveguides", IEEE J. Quantum Electron., vol. 28, pp. 650–657, 1992.

B.M.A. Rahman, Y. Liu, and K.T.V. Grattan, "Finite-element modeling of one- and two-dimensional MQW semiconductor optical devices", IEEE Photon. Technol. Lett., vol. 5, pp. 928–931, 1993.

S. Adachi, "Optical properties of $In_{1-x}Ga_xAs_yP_{1-y}$, alloys", Phys. Rev. B, vol. 39, pp. 12612–12621, 1989.

N. Osman, M. Koshiba, and R. Kaji, "A comprehensive analysis of multilayer channel waveguides", J. Lightwave Technol., vol. 12, pp. 821–826, 1994.

D.A.B. Miller, J.S. Weiner, and D.S. Cbernla, "Electric-field dependence of linear optical properties in quantum well structures: Waveguide electroabsorption and sum rules", J. Quantum Electron., vol. QE–22, pp. 1816–1830, 1986.

K. Komatsu, K. Hamamoto, M. Sugimoto, A. Ajisawa, Y. Kohga, and A. Suzuki, "4×4 GaAs/AIGaAs optical matrix switches with unifonn device characteristics using alternating Δβ electrooptic guided-wave directional couplers", J. Lightwave Technol., pp. 871–878, 1991.

K. Hamamoto, S. Sugou, K. Komatsu, and M. Kitamura, "Extremely low loss 4×4 GaAs/AlGaAs optical matrix switch", Electron Lett., pp. 1580–1582, 1993.

P.J. Stevens, M. Whitehead, G. Parry, and K. Woodbridge, "Computer modeling of the electric field dependent absorption spectrum of multiple quantum wee material", J. Quantum Electron, vol. 24, pp. 2007–2016, 1988.

L.B. Soldano et al., "Optical Multi-Mode Interference Devices Based on Self-Imaging: Principle and Applications," J. Lightwave Technol., pp. 615–627, 1995.

D. Yevick et al., "Correspondence of Variational Finite-Difference (Relaxation) and Imaginary-Distance Propogation Methods for Modal Analysis," Opt. Lett., vol. 17, pp. 329–330, 1992.

M. Jaros, "Physics and Applications of Semiconductor Microstructures," Oxford University Press, 1989, pp ix–xi.

R.L. Liboff, "Introductory Quantum Mechanics," Addison Wesley, 1992, pp. xi–xv.

J. Singh, "Semiconductor Optoelectronics: Physics and Technology," McGraw Hill, 1995, pp ix–xxi.

M.N. Khan et al., "Fabrication-Tolerant, Low-Loss, and High-Speed Digital Optical Switches in InGaAsP/InP Quantum Wells," ECOC'95 (IEEE Cat. No. 95TH8127), vol. 1, pp. 103–106, 1995.

T.A. Ramadan et al., "Adiabatic Couplers: Design Rules and Optimization," J. Lightwave Technol., vol. 16, pp. 277–283, 1998.

A. Bandyopadhyay et al., "Low-Voltage Vertical Directional Coupler Switch with Suppressed Electroabsorption", IEEE J. of Quantum Elec., vol. 32, No. 6, pp. 1048–1053, 1996.

H.A. Haus et al., "Approximate analysis of optical waveguide grating coupling coefficients", Applied Optics, vol. 15, No. 3, pp. 774–781, 1976.

Chi Wu, "A Vertically Coupled InGaAsP/InP Directional Coupler Filter of Ultranarrow Bandwidth", IEEE Phot. Technol. Lett., vol. 3, No. 6, pp. 519–521, 1991.

Sakata et al., "Wavelength tuning in a grating-assisted vertical coupler filter using quantum well electrorefraction", Appl. Phys. Lett. 59 (24), pp. 3081–3083, 1991.

B. Mukherjee, "Optical Communication Networks", McGraw Hill, 1997.

G.P. Agrawal, "Fiber Optic Communication Systems", John Wiley & Sons, 1997.

L. Kazovsky et al., "Optical Fiber Communication Systems", Artech House, 1996.

T. E. Stern and K. Bala, "Multiwavelength Lightwave Optical Networks: A Layered Approach", Addison–Wesely, 1999.

A.A.M. Staring and M.K. Smit, "Phased-array-based photonic integrated circuits for wavelength division multiplexing applications", ICICE Trans. Electron., vol. E80–C, pp. 646–653, 1997.

D. Marcuse, Theory of dielectric optical waveguides, 2nd Ed., Academic Press, 1991.

W. Wakita, Semiconductor optical modulators, Kluwer Academic Publishers, 1998.

M. Born and E. Wolf, Principles of Optics, 5th Ed., Pergamon, 1975.

M. Jaros, "Physics and Applications of Semiconductor Microstructures," Oxford University Press, 1989.

R.L. Liboff, "Introductory Quantum Mechanics," Addison Wesley, 1992.

J. Singh, "Semiconductor Optoelectronics: Physics and Technology," McGraw Hill, 1995.

W. Streifer, D.R. Scifres, and R.D. Burnham, "Optical analysis of multiple-quantum-well lasers", Appl. Opt., vol. 18, pp. 3547–3548, 1979.

S.L. Chuang, "Physics of Optoelectronic Devices," John Wiley & Sons, 1995.

R.C. Alferness et al., "Broadly tunable InGaAsP/InP buried rib waveguide vertical coupler filter", Appl. Phys. Lett. 60 (8), pp. 980–82, 1992.

D.A. Smith et al., "Integrated-optic acoustically tunable filters for WDM networks", IEEE J. Select. Areas Commun., vol. 8, pp. 1151–1159, 1990.

\* cited by examiner

COUPLER-MULTIPLEXER PERMUTATION SWITCH

BACKGROUND OF THE INVENTION

1. Field of the Invention

The present invention relates to Wavelength-Division Multiplexing (WDM) networks. In particular, the present invention relates to optical network structures that perform multiplexing and switching of WDM signals.

2. Description of the Related Art

In recent years, communication technology has rapidly and significantly improved. Today, much information is transmitted via optical fibers which allow the transport of information at high data rates. Optical fibers also offer much higher bandwidth than conventional coaxial communications. Nevertheless, an increased data transmission through communication networks places an increasing demand on communications link bandwidth. WDM is an attractive technique for increasing the aggregate capacity of optical networks. In a wavelength division multiplexed optical communication system, several different channels at different optical wavelengths are combined into a fiber to allow for a more efficient use of its bandwidth.

Initially, the WDM channels were multiplexed and coupled into an optical fiber at the transmitting end, transmitted to a receiver end using the same optical path, and then de-multiplexed at the receiver end. This was commonly referred to as a point-to-point WDM transmission. In case of point-to-point WDM transmission, the optical network nodes only served as conduits of the transmitted data without any advanced functionality.

Subsequently, WDM networks evolved from simple point-to-point transmission to more complicated multi-user networks with arbitrary physical topologies. In case of an optical network with arbitrary physical topology, different channels may follow different optical paths in the network. There are several classes of such networks: wavelength-routed, static optical and linear optical networks. A class of networks in which optical signals are routed to different optical paths based on their wavelengths are known as wavelength routed networks. The specific optical paths for each channel are determined by a routing algorithm. The routing algorithm is designed based on a specified criteria, e.g., the shortest path between a source and a destination. The optical network nodes in this class are capable of routing signals to different paths depending on their wavelengths. In static optical networks, the star couplers are used as the optical network nodes which are capable of broadcasting an input signal from any source to all destinations in the network. In linear optical networks, even more complex components are used because the optical network nodes are required both to broadcast and to route different channels. For this reason, there have been attempts to provide the network nodes that could perform specific multiplexing, filtering, routing or switching functions.

For example, in Y. Tachikawa et al., *Arrayed-Waveguide Grating Multiplexers with loop-back optical paths and its applications*, J. Lightwave Tech., Vol. 14, pp. 977–84 (1996), a static add/drop multiplexer which uses an N×N-array waveguide grading multiplexer combined with N-2 loop-back fibers is illustrated.

Another example is disclosed in O. Ishida et al., *Digitally Tunable Optical Filters using Array-Waveguide Grating (AWG) Multiplexers and Optical Switches*, J. Lightwave Tech. Vol. 15, pp. 321–27 (1997). Ishida discloses a digital tunable optical filter which uses an N×N-arrayed waveguide grating multiplexer combined with a number of 1×2 switch elements. In this example, the number of 1×2 switch elements is equal to the square root of N.

In A. A. M. Staring et al., *Phased-Array-Based Photonic Integrated Circuits for Wavelength Division Multiplexing Applications*, ICICE Trans. Electron., Vol. E80-C, pp. 646–653 (1997), an integrated four-channel add/drop multiplexer is illustrated. The add/drop multiplexer in this example uses a 5×5-phased array (PHASAR) multiplexer and four Mach-Zehnder interferometer (MZI) switches. A wavelength selective optical switching is accomplished by using a wavelength converter and a 5×5 PHASAR. The 5×5 PHASAR is used as a static router. The wavelength converter, in this example, has an Erbium-doped fiber amplifier (EDFA), a distributed Bragg reflector (DBR) laser, and a 3 dB coupler.

The evolution of WDM networks has imposed a functionality burden on the optical network nodes (ONN). It is desired that the signal be kept in an optical form as it passes through the network because it increases the network speed. In other words, it is desirable to preserve network transparency. However, this means that the ONNs have to perform many functions in the physical (optical) layer instead of the electronic (logical) layer.

Unfortunately, each of the multi-function transparent optical network nodes known hereto suffer from a common drawback in that they combine individual components, i.e. switches, multiplexers, filters and routers, in a conventional way to perform a specific routing and switching functions. Hence, their functionality density, i.e., the number of functions divided by the number of components used is low. Accordingly, there remains a need for a photonic WDM component with high functionality density that can couple a single-mode and a multi-mode waveguides and can combine a plurality of functions.

SUMMARY OF THE INVENTION

An object of the present invention is to provide an optical device that integrates multiplexing and switching functions.

Another object of the present invention is to provide an optical device having a high functional density.

Yet another object of the present invention is to map a wavelength spectrum of input WDM channels carried on a single mode waveguide into a modal spectrum of a multi-mode waveguide.

Still another object of the present invention is to allow for a dynamic changing of the multiplexing pattern.

Yet another object of the present invention is to minimize an effect of multi-wave mixing on long-haul optical fiber communication.

In order to meet these and other objects which will become apparent with reference to further disclosure set forth below, the present invention provides a novel coupler-multiplexer permutation switch. The coupler-multiplexer permutation switch (CMPS) maps a wavelength spectrum of the input WDM channels, carried in a single-mode waveguide, onto a modal spectrum of a multi-mode waveguide and then demultiplexes and permutates the wavelength-assigned modes. The mapping is accomplished by using a single-/multi-mode backward coupler. Demultiplexing and switching are accomplished by using a digital optical switch.

In a preferred embodiment, each channel of a single-mode waveguide is phase-matched through a grating with a corresponding backward mode of a multi-mode waveguide. Each channel is coupled with a different mode, and the number of multi-mode waveguide modes equals the number of single-mode waveguide channels. The different channels are then separated by using a digital optical switch (DOS).

In another preferred embodiment, unequally spaced channels are phase-matched with only even-ordered modes of a multi-mode waveguide. Hence, a number of even-ordered modes in the multi-mode waveguide equals the number of channels in the single-mode waveguide. The number of output waveguides from a digital optical switch equals the number of modes. Once the channels are mapped onto the corresponding even-ordered modes, they are separated by using a portion of output waveguides from the digital optical switch, with remaining output waveguides being idle.

In yet another embodiment, different permutations in a multiplexing pattern are obtained by electronically controlling the effective-index distribution of the DOS output waveguides. This electronic control is accomplished by using a low driving-voltage device based on a quantum-confined Stark effect (QCSE).

In still another embodiment, an add/drop multiplexer is integrated with a common grating on a single substrate. This integration minimizes a mismatch between the multiplexer and the demultiplexer characteristics.

In yet another embodiment, the CMPS is integrated with photodetectors in a WDM receiver. Alternately, the CMPS may be integrated with a laser diode as a reconfigurable multi-wavelength WDM transmitter.

The accompanying drawings, which are incorporated and constitute part of this disclosure, illustrate preferred embodiments of the invention and serve to explain the principles of the invention.

DESCRIPTION OF THE PREFERRED EMBODIMENTS

Figure 1A:
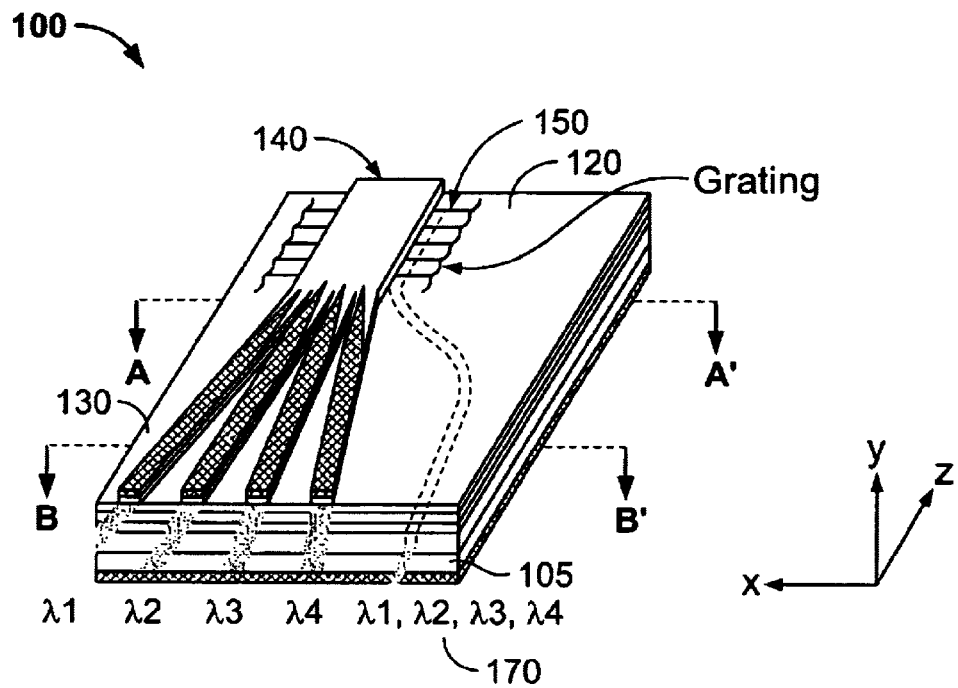
FIG. 1a is a schematic diagram of one preferred embodiment of the present invention.

Referring to FIG. 1a, an exemplary embodiment of the present invention will now be described. FIG. 1a shows a coupler-multiplexer permutation switch (CMPS) 100 which acts both as a demultiplexer and a switch. The CMPS 100 includes a single-mode/multi-mode backward coupler 120, and a digital optical switch 130, both mounted on a common substrate 105. The CMPS 100 may also include other features, such as photodetectors, lasers, optical amplifiers or other features known in the art.

In a preferred embodiment, a single-mode waveguide (not shown) is coupled with the digital optical switch 130 by using the single-mode/multi-mode backward coupler 120. The central idea of the CMPS 100 is to map a wavelength spectrum 170 of the input wavelength-division-multiplexing (WDM) channels carried in a single-mode waveguide into a modal spectrum of a multi-mode waveguide 140, and then to demultiplex and permutate the wavelength-assigned modes. The mapping is carried out in a single-mode/multimode backward coupler 120. Demultiplexing and permutation take place in the digital optical switch 130.

The coupler-multiplexer permutation switch 100 may be designed in two stages. The first stage involves a design of the single-mode/multi-mode backward coupler 120, whereas the second stage involves a design of the digital optical switch 130. The single-mode/multi-mode backward coupler 120 is polarization sensitive, so it is designed for $E^x$ polarization. The digital optical switch 130 uses quaternary-compound InGaAsP/InP multi-quantum wells (MQW) in order to operate in the 1.55 μm range of the Erbium-doped fiber amplifier. Several iterative steps in the design of the CMPS 100 may be carried out to determine the CMPS parameters that satisfy individual design requirements for each stage.

In a preferred embodiment, the single-mode/multi-mode backward coupler 120 has a single-mode waveguide receiver 110, a short-period grating 150, a separation layer 155, and a multi-mode waveguide 140. The single-mode waveguide receiver 110 has an inverted rib 112 and a slab 114 (see FIG. 1d). The multi-mode waveguide 140 has a rib 142 and a slab 144 (see FIG. 1d). The wavelength spectrum 170 with unequally spaced channels propagates in the single-mode waveguide receiver 110, where the channel powers are confined in the lateral direction by the inverted rib 112 and in the vertical direction by the separation layer 155.

The separation layer 155 is epitaxially grown between the single-mode waveguide receiver 110 and the multi-mode waveguide 140 to confine not only the channel powers of the wavelength spectrum 170, but also the modal powers of the multi-mode waveguide 140. The confined channel powers of the wavelength spectrum 170 and the modal powers of the multi-mode waveguide 140 overlap in the separation layer 155, thus making it possible for the single-mode/multi-mode backward coupler 120 to couple the single-mode waveguide spectrum 170 into the corresponding multi-mode waveguide modes.

In order to couple the channel powers of the forward-propagating wavelength spectrum 170 with the corresponding backward-propagating modes (not shown) of the multi-mode waveguide 140, a short-period grating 150 is used. The grating 150 has a short period to allow for a phase-matching of each single-mode waveguide channel propagating in the forward direction with a corresponding multi-mode waveguide mode propagating in the backward direction. The phase-matching, then, enables the transferring of the channel powers from the single-mode waveguide receiver 110 into the different modes of the multi-mode waveguide 140. The short-period grating 150 matches each effective index (a propagation constant) of the single-mode waveguide spectrum 170 at wavelength $\lambda_i$, to an effective index (propagation constant) of the corresponding phase-matching mode of the multimode waveguide 140. The multi-mode waveguide modes (not shown) with the corresponding effective indices then propagate to the digital optical switch 130, where they are de-multiplexed and permutated, namely, where the effective indices are distributed to the appropriate output waveguides 160. The effective-index distribution in the output waveguides 160 is electronically controlled to allow for different permutations in the output-demultiplexing pattern.

Figure 1B:
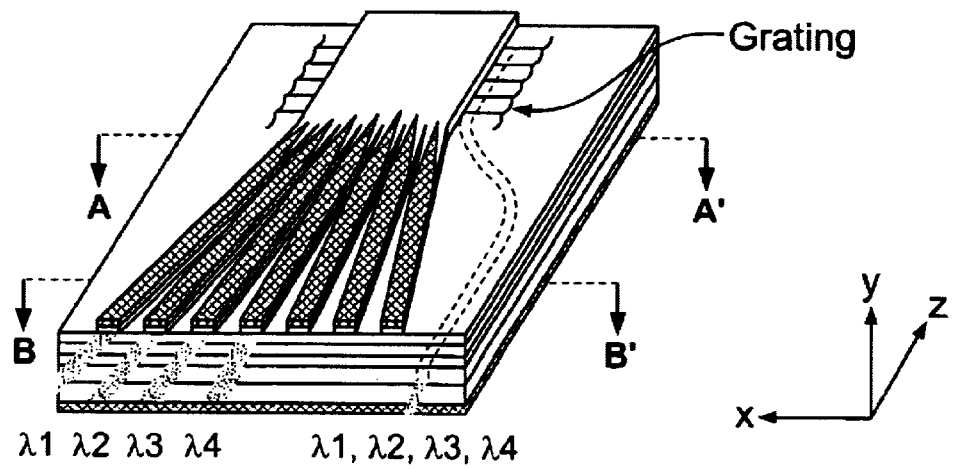
FIG. 1b is a schematic diagram of another preferred embodiment of the present invention.
Figure 1C:
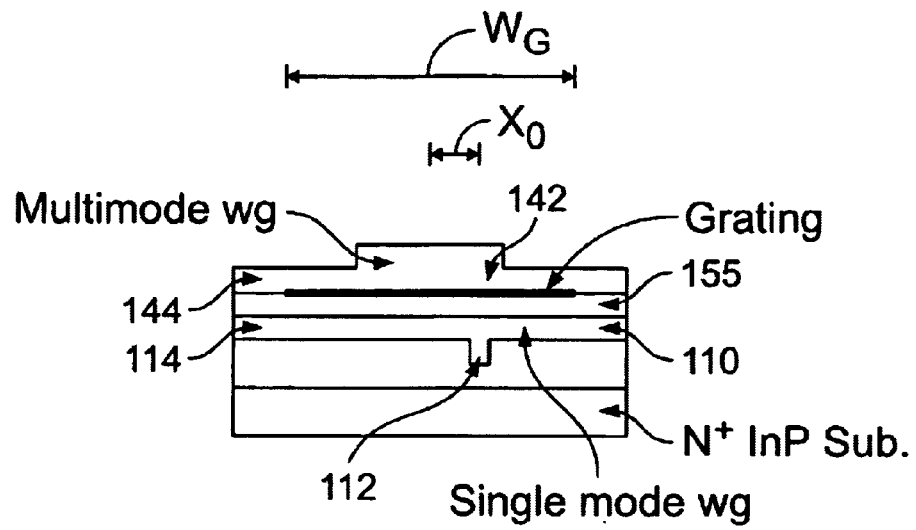
FIG. 1c is a cross-sectional diagram of the embodiment of FIG. 1a along the lines A–A'.

Referring to FIG. 1c, a cross-sectional view of the CMPS 100 along the lines A–A' is illustrated. The inverted rib of the single-mode waveguide receiver 110, carrying the wavelength spectrum 170 of unequally spaced channels, has a width $W^{(A)}$, the grating 150 has a width $W_G$ and the multimode waveguide rib has a width $W^{(B)}$. The single-mode waveguide receiver 110 and the multi-mode waveguide 140 are laterally offset, so that a distance between their centers is $X_0$. It is possible to estimate the feasibility of the basic operation of the coupler-multiplexer permutation switch (CMPS) 100 by approximating the waveguide electromagnetic modal fields with sinusoidal functions. This estimate is based on an analytical solution obtained by using a separation of variables under high confinement approximation. If modal powers are laterally localized in the multi-mode waveguide rib, it is said that they are laterally confined.

Assuming high lateral confinement of the modes, a lateral component I of the overlap integral between the normalized modal fields of the single-mode and the multimode waveguides may be given by $$I = \frac{2}{\sqrt{W^{(A)}W^{(B)}}} \int_{-W^{(A)}/2}^{W^{(A)}/2} \sin\left((k+1)\frac{\pi}{W^{(B)}}\left(x + x_o + \frac{W^{(B)}}{2}\right)\right) \cos\left(\frac{\pi}{W^{(A)}}x\right) dx, \quad (1)$$

where $W^{(A)}$ is an effective width of the single-mode waveguide receiver's inverted rib, and $W^{(B)}$ is an effective width of the multi-mode waveguide's rib, $X_0$ is a lateral offset between the rib centers of the single-mode waveguide receiver 110 and the multi-mode waveguide 140, and k is a mode index. In equation (1), it is assumed that a complete lateral overlap takes place between the single-mode receiver 110 and the multimode waveguide 140, namely, $$\frac{W^{(B)}}{2} \geq |x_o| + \frac{W^{(A)}}{2}. \quad (2)$$

The result of the integration in (1) is given by $$I = \frac{\sqrt[4]{q}/\pi}{1-(k+1)^2 q^2} \cos\left((k+1)q\frac{\pi}{2}\right) \sin\left((k+1)(p+1)\frac{\pi}{2}\right) \quad (3a)$$

where, $$p = \frac{2x_o}{W^{(B)}}, \text{ and } q = \frac{W^{(A)}}{W^{(B)}}. \quad (3b)$$

When designing the single-mode/multi-mode backward coupler 120, it is desired to suppress modal dependence of the overlap integral because it is desired to avoid large variations in the channel bandwidths of the single-mode/multi-mode backward coupler. In other words, a normalized offset parameter p and a ratio between the single-mode waveguide receiver rib and the multi-mode waveguide rib q (rib width ratio) must be chosen carefully so that the overlap integral is independent of the mode index k.

Hence, in order to suppress the modal dependence of the overlap integral, the following requirement should be satisfied:

$$q \ll 1/M, \quad (4a)$$

where, $M = k_{max} + 1$ is the number of multimode-waveguide modes. In other words, the width of the single-mode waveguide receiver rib must be much smaller than the width of the multimode waveguide rib.

The integration result with the added requirement $q \ll 1/M$, suggests two different design approaches. In a first design approach, a non-zero value of the normalized offset parameter p is used to "excite" all modes of the multi-mode waveguide 140. In a second design approach, the value of p=0 is used to selectively excite the even-ordered modes of the multi-mode waveguide 140.

Referring back to FIG. 1a, one preferred embodiment, which uses the first design approach where all modes are excited, is illustrated. The normalized offset parameter p is chosen to satisfy:

$$p \to 1, \quad (4b)$$

which means that the single-mode waveguide receiver 110 is placed towards the lateral edge of the multimode waveguide 140 as shown in FIG. 1.

The CMPS channel bandwidth depends on coupling strength between the single-mode waveguide receiver 110 and the multi-mode waveguide 140. Bandwidth dependence on coupling strength is mainly determined by the overlap integral uniformity for different values of mode index k. Hence, the overlap integral uniformity, in other words, coupling uniformity, limits the number of WDM channels that can be handled by the CMPS 100. In order to estimate coupling uniformity, a coupling uniformity parameter $\rho$, defined as $$\rho \equiv 1 - \min_k |I| / \max_k |I|, \quad (5)$$

and limited by $0 \leq \rho \leq 1$ is used. The values $$\min_k |I|, \text{ and } \max_k |I|$$

refer to the minimum and maximum values of |I| for different values of the mode index k. The uniformity coupling parameter $\rho$ is close to zero in cases of small variations in coupling.

Figure 2:
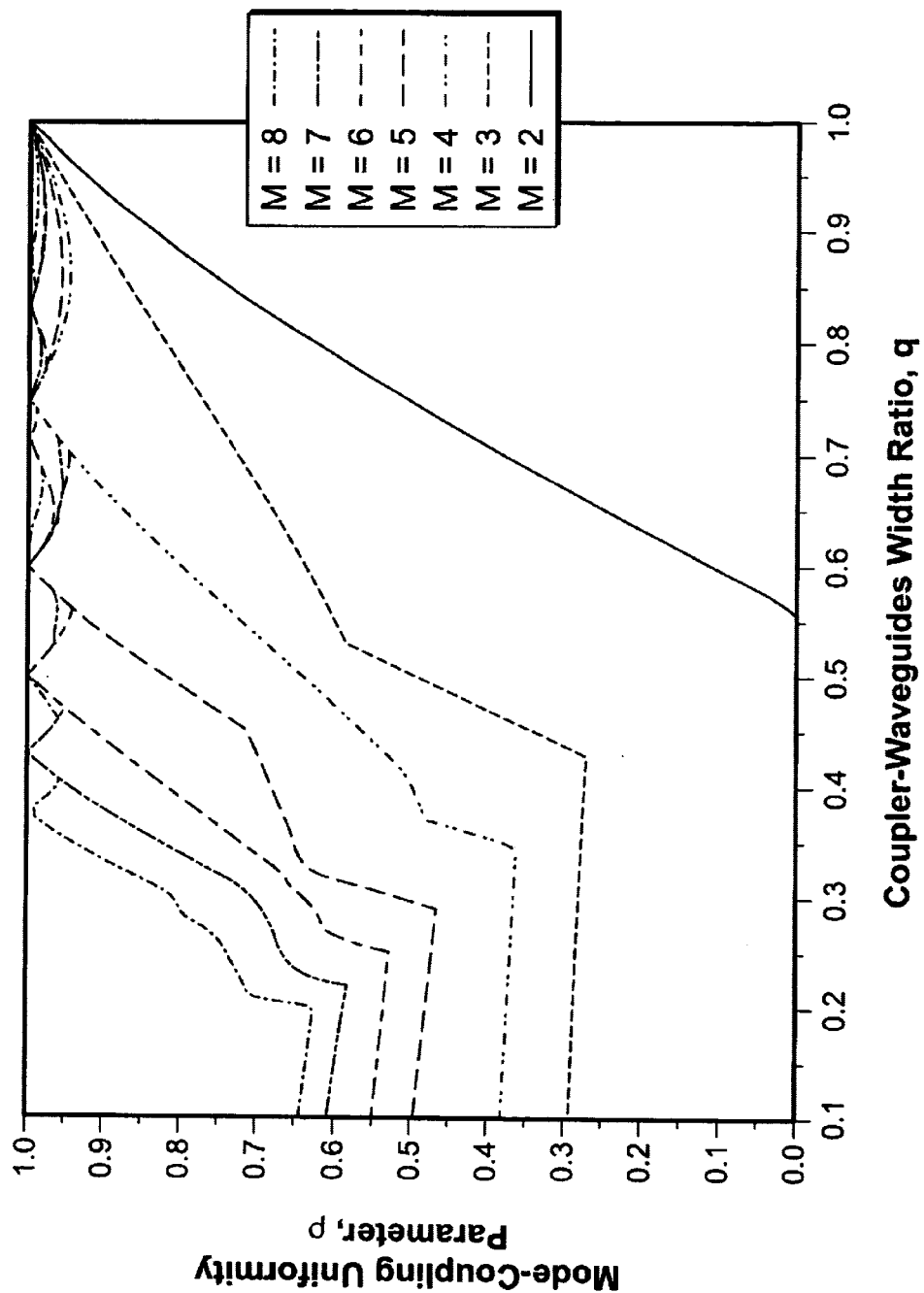
FIG. 2 is a Cartegian graph of a mode-coupling uniformity parameter as a function of a single-mode to multi-mode waveguide widths ratio for a single-mode/multi-mode backward coupler design in which all multi-mode waveguide modes are excited.

Referring to FIG. 2, a minimum value of the coupling uniformity parameter $\rho$ as a function of the rib-width ratio q for different number of output modes M is illustrated. This function represents the coupling uniformity parameter $\rho$ for the case of exciting all modes of the multi-mode waveguide 140. The minimum values of $\rho$ are calculated over the normalized offset parameter p, for each value of q. The results show that there is a floor on excitation uniformity of the multi-mode waveguide modes which increases with the number of modes. In other words, the variations in coupling increase with the number of modes. For example, for M=4, and assuming that, $W^{(A)} = 1$ μm, and $W^{(B)} = 8$ μm, which corresponds to q=0.125, then the value of $\rho \cong 0.38$ is approximately the level of the floor for this case. Using (3) and (5) it can be shown that this value occurs at $\rho \cong 0.61$ which corresponds to an offset, $|x_o| \cong 2.4$ µm.

The single-mode waveguide receiver 110 and the multi-mode waveguide 140 are asynchronous enough to compete against both proximity coupling and backward-reflection-grating coupling in the same waveguide. Hence, only backward cross-coupling is considered in the formulation of the problem and, for that reason, the system modes of the overall coupler structure are well represented by the isolated modes of the individual waveguides. In addition, the power transferred to the unmatched output modes is negligible when compared to the power transferred to the phase-matched output modes. Hence, only the backward cross-coupling interaction between the input mode of the single-mode waveguide receiver 110 and the $i^{th}$ mode of the multimode waveguide 140 that is phase matched by a grating with the period $\Lambda$, at a channel wavelength, $\lambda_i$, needs to be considered.

The single-mode/multi-mode backward coupler 120 can be described by using the equations for a usual coupling of modes:

$$\frac{dA_o}{dz} = jK_{oi}B_i e^{-j\Delta_{oi}^z} \tag{6a}$$

$$\frac{dB_i}{dz} = +jK_{oi}A_o e^{-j\Delta_{oi}^z} \tag{6b}$$

with $$\Delta_{oi} = \frac{2\pi}{\Lambda} - \beta_o^{(A)} - \beta_i^{(B)}, \tag{6c}$$

$$K_{oi} = \frac{\omega \varepsilon_o}{4\pi P}(n_f^2 - n_s^2) \int_{Grat.}\int \vec{E}_o^{(A)}(x,y) \cdot \vec{E}_i^{(B)}(x,y)\,dxdy. \tag{6d}$$

Here, $(A_o, B_1)$, $(\beta_o^{(A)}, \beta_1^{(B)})$, $(\vec{E}_o^{(A)}, \vec{E}_i^{(B)})(x, y)$ dxdy, and P are the slowly varying amplitudes, propagation constants, electric field vectors, and a power of the two interacting modes, respectively. The overlap integral between the electromagnetic modal fields in (6d) is bound by a grating-perturbation area. The grating-perturbation area is represented by the grating 150 that has its length, height, width and a short period. The short-period grating 150 can take many forms, such as a square function, sinusoidal function, triangular function etc. The quantity $\Delta_{oi}$ is a phase-mismatch parameter, whereas $K_{oi}$ is a grating coupling coefficient. The quantities $n_s$, and $n_f$ represent the refractive indices of the separation layer 155 and the multi-mode waveguide core, i.e. the slab__and the rib__, for the perturbed waveguide, respectively. The coupling coefficient, $K_{oi}$, given by (6d) for $E^x$ modes, can be approximated for different forms of the grating 150.

For example, in case of a sinusoidal grating, the coupling coefficient may be approximated by $$K_{oi} \cong \frac{\pi}{2\lambda}\frac{(n_f^2 - n_s^2)}{\sqrt{N_o^{(A)}N_i^{(B)}}}\int_{Grat.}\int \varepsilon_o^{(A)}(x,y)\varepsilon_i^{(B)}(x,y)\,dxdy, \tag{7}$$

where $\lambda$ is the free space wavelength. The quantities ($N_0^{(A)}$, $N_1^{(B)}$), and ($\epsilon_0^{(A)}$, $\epsilon_1^{(B)}$) are the effective indices and the transverse normalized components of the single-mode waveguide channel and the corresponding multi-mode waveguide mode, respectively. A similar approximation result is obtained for other shapes of the grating 150, but different shapes will yield different results. Note that the coupling coefficient is wavelength dependent.

However, it is important to note that the wavelength spacing between successive channels is about 1 nm, so the maximum spacing between WDM channels is still negligible when compared with the channel wavelength, which is 1.55 µm. Hence, the wavelength dependence of the right hand side of (7) implies a negligible change in the value of the coupling coefficient $K_{oi}$, within the small wavelength range of the WDM channels.

An important consideration in the design of the single-mode/multi-mode backward coupler 120 is a variation of the coupler performance due to modal variations in $K_{oi}$. These changes are determined primarily by the modal dependence of the overlap integral in (6d) and (7).

For a single-mode/multi-mode backward coupler of length L, the ratio $R_{oi}$ between the reflected output power of the $i^{th}$ mode and the incident input power of the single-mode waveguide receiver at the phase-matched wavelength, $\lambda_i$, is given by $$R_{oi} = \tan h^2(K_{oi}L). \tag{8}$$

This means that in case of single-mode/multi-mode backward couplers, as opposed to forward couplers, the saturation behavior of the hyperbolic tangent function at high values of $K_{oi}L$ suppresses any change in the power transfer ratio $R_{oi}$, due to change in the coupling coefficient $K_{oi}$, for the different output modes.

However, the bandwidth for each wavelength-"tagged" mode is sensitive to variations in $K_{oi}$. The bandwidth, $\Delta\lambda_{oi}$, is given by $$\Delta\lambda_{oi} = \frac{G(K_{oi}L)}{L\frac{d}{d\lambda}\left|\beta^{(A)} + \beta_{io}^{(B)}\right|} \tag{9a}$$

with $$G(K_{oi}L) = 4\sqrt{(\eta L)^2 + (K_{oi}L)^2}, \tag{9b}$$

where the quantity, $\eta L$, is the solution of $$\frac{(K_{oi}L)^2 \sin^2(\eta L)}{(\eta L)^2 + (K_{oi}L)^2 \sin^2(\eta L)} = \frac{1}{2}tahn^2(K_{oi}L). \tag{9c}$$

This expression yields an almost linear dependence of the bandwidth on $K_{oi}$ for high values of $K_{oi}L$. As a result, a constant value of $K_{oi}$ is necessary for equal coupler-filter bandwidths among the different output modes. Since $K_{oi}$ depends on modal overlap, the quantity $\rho$, as defined in (5) is used to characterize the similarity of bandwidths among different channels.

In order to efficiently couple the single-mode waveguide 110 with the multi-mode waveguide 140, their parameters and the parameters of the layers surrounding them must be carefully chosen. Some examples of the parameters that have to be determined are a waveguide core refractive index $n_f$, the separation layer refractive index $n_s$, ths substrate refractive index, a refractive index of the layer covering the waveguide $n_c$ (cover refractive index), rib widths W, rib heights h, and slab thicknesses t, of the single-mode waveguide receiver 110 and the multimode waveguide 140. These parameters, in addition to the grating parameters, are designed to satisfy the single-mode/multi-mode backward coupler requirements.

Since transparent optical networks use Erbium doped fiber amplifiers, which operate in the 1.55 µm range, it is desired to design the CMPS 100 to operate in that range, namely, $\lambda_{design}$=1.552.56 nm, where $\lambda_{design}$ is a free-space reference channel wavelength that corresponds to backward cross-coupling to a higher-order output mode. The multi-mode waveguide parameters are chosen to be $n_f^{(B)}$=3.287, $n_s^{(B)}$=3.235, $n_c^{(B)}$=1, $h^{(B)}$=1.1 μm, $t^{(B)}$=0.3 μm, and $W^{(B)}$=8 μm. The single-mode parameters are chosen to be $n_f^{(A)}$= 3.315, $n_s^{(A)}$=3.235, $n_c^{(A)}$=3.21, $h^{(A)}$=1.1 μm, $t^{(A)}$=0.1 μm, and $W^{(A)}$=1 μm. These parameters are chosen by using a 3D beam-propagation-method (BPM) simulator. The 3D-BPM simulator employs a difference approach and incorporates transparent boundary conditions to compute the modal field distributions used in calculating the parameters.

An optimal value of lateral offset, $X_o$, between the centers of two ribs, is chosen during the calculations for a minimum value of p required to minimize the fluctuation in the coupler-filter bandwidths among different channels. To evaluate this minimum value of p, numerical calculations of the overlap integral in (6) are performed at different values of lateral waveguide offset $X_o$, with a multimode-waveguide grating of width $W_G$=16 μm, and depth, $D_{gr}$=80 nm. A minimum value of p≅0.33 occurs at $X_o$=3 μm.

However, this choice of geometry also leads to an increased electromagnetic modal-field overlap, unlimited by the grating perturbation area, between the highly confined mode of the single-mode waveguide receiver 110 and the weakly confined higher-order modes of the multimode waveguide 140. This increase in electromagnetic modal-field overlap may result in a nonsymmetrical proximity coupling that can cause a strong forward cross-coupling in one direction. Therefore, the parameters of the single-mode waveguide receiver 110 and the multimode waveguide 140, as well as the parameters of the separation layer 155 between them, are chosen carefully in order to minimize the electromagnetic modal-field overlap and provide high forward-power-transfer decoupling in both a direction from the single-mode waveguide receiver 110 to the multi-mode waveguide 140 and vice versa. Moreover, the parameters are chosen so that the modal confinement of the multimode waveguide 140 is sufficiently high to ensure intra-modal spectral separation large enough to minimize channel crosstalks.

The grating 150 is etched onto a top surface of the separation layer 155, between the multi-mode waveguide 140 and the single-mode waveguide receiver 110 in order to couple efficiently the power of each channel from the single-mode waveguide receiver 110 to a corresponding backward propagating mode of the multi-mode waveguide 140. The grating 150 can also be etched elsewhere, for example, at the bottom surface of the multi-mode waveguide 140. The grating period in the 1×4 CMPS example is chosen to be Λ=239.065 nm. The grating period is calculated using $$\Lambda = \frac{\lambda_{design}}{N_o^{(A)} + N_{i_{max}}^{(B)}} \quad (10)$$

where $\lambda_{design}$=1.5552.36 nm is a free-space reference channel wavelength that corresponds to backward cross-coupling to the highest-order output mode, $N_o^{(A)}$ is the effective index of the single-mode waveguide receiver 110 and $N_{1max}^{(A)}$ is the effective index of the highest-order mode of the multimode waveguide 140. The coupling to lower-order modes of the multi-mode waveguide 140 takes place at longer wavelengths.

The channel frequencies for different modes range from 193.123 THz for mode #0 to 193.548 THz for mode #3 in this example. If the separation layer 155 is 1.1 μm thick, the insertion loss to both forward cross-coupling and grating-reflection coupling is roughly less than 1 dB. The backward-coupler's length required for a power transfer ratio of more than 93% is L≅7.4 mm. The channel bandwidths range from a minimum value of 11.36 GHz for channel No. 1 (mode 0), 12.61 GHz for channel No. 4 (mode 3), 14.98 GHz for Channel No. 3 (mode 2) to a maximum value of 15.23 GHz for channel No. 2 (mode 1), with ±1.9 GHz bandwidth fluctuation.

Figure 3:
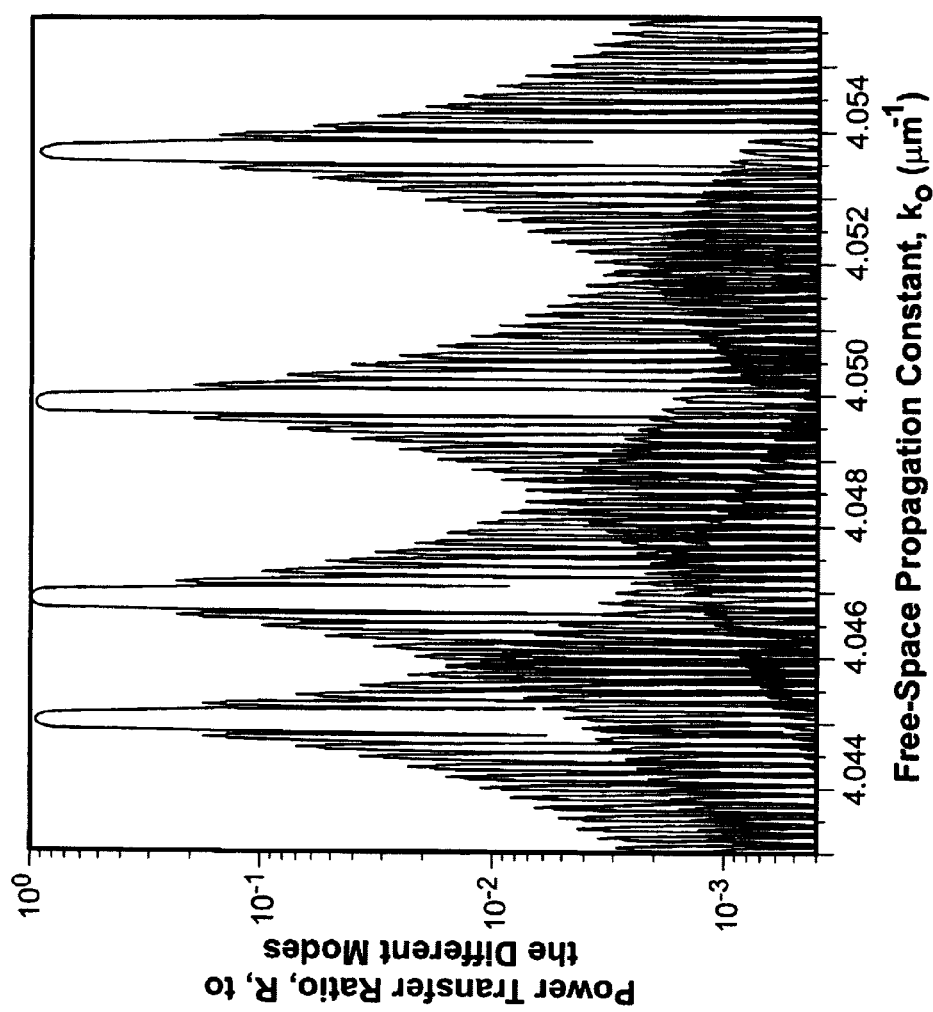
FIG. 3 represents a graph of a power transfer ratio to the different multi-waveguide modes as a function of a free-space propagation constant.

Referring to FIG. 3, a graph of a power transfer ratio R as a function of a free-propagation constant $k_0$ is illustrated. A part of this function is oscillatory and it has an envelope $R_{oj}$. Based on the parameters chosen in this example, channel crosstalk defined as $$10\,Log_{10}\left(\sum_{j\neq i} R_{oj}/R_{oi}\right)$$

for the $\lambda_i$ channel, is better then −25.43 dB. Channel cross-talk ranges from −25.43 dB for Channel 1, to 31.32 dB for channel 4. This provides an example of the first stage in the process of designing the coupler-multiplexer permutation switch 100.

Referring to FIG. 1b, another preferred embodiment, using the second design approach is illustrated. For example, if the single-mode waveguide carries four channels, then the multi-mode waveguide is designed to support seven guided modes. The 1×4 CMPS 100 in this example has a single-mode/multi-mode backward coupler 120, a multi-mode waveguide 140 supporting seven modes and a 1×7 digital optical switch 130 with three idle output waveguides. The single-mode/multi-mode backward coupler 120 couples the forward-propagating channels of the single-mode waveguide receiver 110 with the even-ordered backward-propagating modes of the multi-mode waveguide 140. Since the number of even-ordered modes in the multi-mode waveguide 140 equals the number of channels in the single-mode waveguide spectrum 170, the multi-mode waveguide 140, in this example, is designed to support seven modes. This, in turn, requires seven output waveguides 160 in the digital optical switch 130 because the minimum number of output waveguides 160 equals the number of modes in the multi-mode waveguide 140.

The short-period grating 150 matches the effective index of each single-mode waveguide channels at wavelength $\lambda_i$, to a corresponding effective index of the $i^{th}$ even mode of the multimode waveguide 140. In a grating perturbation area, the crosstalk between the modes can be neglected as they propagate through the multi-mode waveguide 140 in the backward direction because of orthogonality of modes in the ideal-waveguide structure. The even-ordered modes, in this example four modes, are then directed to the digital optical switch 130. Permutation of the modes is accomplished by electronically controlling the effective-index distribution in all output waveguides so that the zero-order mode goes to the output waveguide with the highest effective index etc. As it was already pointed out, the mode separation is asynchronous. This means that the output waveguides 160, which have different effective indices because of the voltage distribution, must be distant from each other. Hence, the distance between the output waveguides 160 increases in the backward propagation direction from the branching point. However, this increase is slow, which means that a separation of the multi-mode waveguide modes is also adiabatic. The mode separation is adiabatic in order to minimize the crosstalk between different channels.

Figure 4:
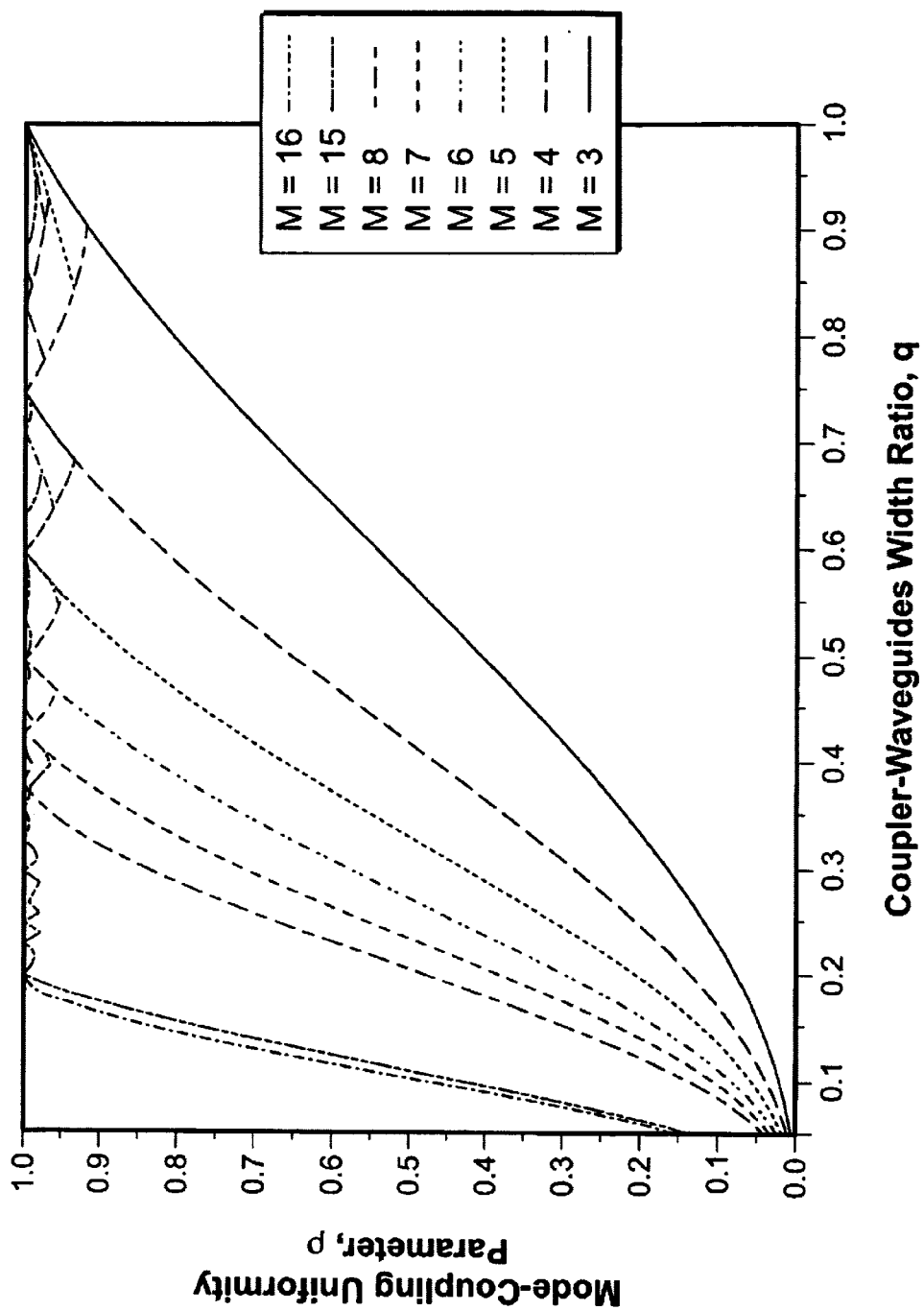
FIG. 4 is a Cartegian graph of a mode-coupling uniformity parameter as a function of a single-mode to multi-mode waveguide widths ratio for a single-mode/multi-mode backward coupler design in which only even-ordered multi-mode waveguide modes are excited.

Referring to FIG. 4, a minimum value of the coupling uniformity parameter ρ as a function of the rib-width ratio q for different number of multi-mode waveguide modes M is illustrated. The results show that there is no floor on excitation uniformity of the output modes even though there is an increase in the number of output waveguides 160. Hence, a larger number of WDM channels can be used for the same tolerance in bandwidth fluctuations.

In case of a second design approach of the 1×4 coupler-multiplexer permutation switch 100, in which only even-ordered modes are excited, the multi-mode parameters chosen for operation in the same 1.55 µm range are: $n_f^{(B)}$=3.287, $n_s^{(B)}$=3.233, $n_c^{(B)}$=1, $h^{(B)}$=1.1 µm, $t^{(B)}$=0.1 µm, and $W^{(B)}$=14.7 µm. This yields a channel frequency spacing of 99.7, 199.4 and 297.9 GHz. These channel frequencies represent the calculations based on the modal spectrum of the isolated multi-mode waveguide 140. However, the spectrum of the isolated waveguides is perturbed, once the single-mode waveguide receiver 110 and the multi-mode waveguide 140 are close to each other. Hence, the separation layer's and the single-mode waveguide receiver's parameters are optimized in order to minimize the perturbation.

In this example, the parameters are selected to be: $n_c^{(A)}$=$n_s^{(A)}$=$n_s^{(B)}$, $h^{(A)}$=0.7 µm, $t^{(A)}$=0.1 µm, and $W^{(A)}$=1.4 µm. The thickness of the separation layer is chosen to be 1.5 µm. This optimization yields the channel frequency spacing of 99.8, 199.9 and 297.3 GHz. The grating period Λ=239.572 nm is chosen to improve a frequency alignment with a standard grid, resulting in less than 3 GHz offset between the CMPS channels and those of the ITU standard grid. In this case, the grating depth $D_g$=50 nm, and a coupler length L=8164 µm, yield a bandwidth that ranges from a minimum value of 10.11 GHz for channel 4 to a maximum value of 13.35 GHz for channel 3 with 1.6 GHz bandwidth fluctuation. The channel crosstalk values are better than −25.14 dB.

The second stage in the CMPS design involves a design of the digital optical switch 130. As an example, the structure of the 1×4 digital optical switch (DOS) will be illustrated. Referring back to FIGS. 1 and 1b, an input of the digital optical switch (DOS) 130 is the multi-mode waveguide 140. An output of the DOS 130 is a number of single-mode output waveguides 160. The number of single-mode output waveguides 160 may vary based on a design approach and number of modes in the multi-mode waveguide 140. The 1×4 CMPS, in which all modes are excited, has four output single-mode waveguides 160. The multi-mode waveguide modes are characterized by their propagation constants. Since the propagation constants are related to the effective indices of the multi-mode waveguide modes, it follows that the multi-mode waveguide modes are characterized by their effective indices. A voltage device (not shown) is used to electronically control the effective-index distribution in the DOS output waveguides 160.

If there is no external driving voltage applied, the output waveguides 160 are synchronous, thus forming a "normally-on" power-splitter operation. In other words, without any applied voltage to the output waveguides of the 1×4 (and generally 1×N) DOS 130, the light power from the multi-mode waveguide 140 is split without any wavelength selectivity. For example, if four different channels from a single-mode waveguide 110 are backward coupled to four different modes of the multi-mode waveguide 140, then the power of each channel is carried on a different mode in the multi-mode waveguide 140. If the DOS output waveguides 160 are symmetrically distributed around the multi-mode waveguide axis, as they are in the first design approach where all the modes are excited, then the DOS 130 splits the power of each mode equally to each output waveguide 160. In other words, the DOS 130 distributes the channels evenly among the output waveguides 160.

When external voltage is applied, the refractive indices of the output waveguides 160 may be changed. By changing the refractive indices, the effective indices of the output waveguides may also be changed. It is important to note that wavelength functions with lower energies tend to localize in output waveguides with higher effective indices, whereas wavelength functions with higher energies localize in output waveguides with lower effective indices. Hence, by electronically controlling the effective indices of the output waveguides, a distribution of wavelength functions can also be controlled. This may result in de-synchronization between the output waveguides so that the zero-order mode, which has the highest refractive index and carries the channel with the longest wavelength, goes into the highest effective-index output waveguide, the first-order mode goes into the next highest-effective-index output waveguide, etc.

Each of the multi-mode waveguide modes carries a different WDM channel coupled to it in the backward coupling stage. As the modes propagate through the output waveguides 160, they accumulate crosstalk. The crosstalk ordinarily results from a continuous change in local output-waveguides coupling, mismatch between local normal modes and isolated waveguide modes at the output end of the DOS 130, and from a refractive index discontinuity at the branching points.

Referring back to FIG. 1b, the electrodes 180 represent the top layer of the output waveguides 160 and the bottom layer of the substrate 105. As the electrodes 180 approach the branching points between the multi-mode waveguide 140 and the output waveguides 160, they are tapered in order to reduce the refractive index discontinuity. The tapered-width electrodes 180, provide adiabatic transitions from the branching points to where the electrodes fully cover the widths of the output guides 160. This geometry substantially reduces cross-talk at the branching points, where the distance between the output waveguides 160 diminishes. Moreover, this geometry facilitates the use of a higher external refractive-index change, which can further reduce cross-talk along the output waveguides 160.

In conjunction with the electrodes 180, a multiple quantum-well structure 190 is used to provide external control over the refractive indices of the output waveguides 160. By applying the external electric field, it is possible to obtain a large refractive index change. This is done by taking advantage of the quantum-confined Stark effect (QCSE). This effect depends on the excitonic absorption. While in bulk semiconductor materials an exciton, which is a combination of an electron and a hole, exists only at low temperatures, the confinement effect of quantum-well structures enables excitons to survive even at room temperatures.

Excitons have maximum absorption near band edges. The amount of excitonic absorption in the quantum-well structures can be controlled by applying an external electric field. The application of the electric field results in a change of energy levels at the lower sub-bands existing in the conduction and valence bands. By using a Kramers-Kronig relation, it can be shown that any change in the absorption, which is a function of the imaginary part of the refractive index, results in a change of the real part of the refractive index, which controls the wave phase. Hence, by electronically controlling the amount of excitonic absorption, the refractive indices of the quantum-well layers, and, as a result, of the effective indices of the output waveguides 160 are controlled.

Quaternary-compound InGaAsP/InP MQW's are used for the MQW structure instead of ternary-compound structures since they provide an extra degree of freedom in which the quantum well width can be chosen for maximum phase modulation, and the material composition can be chosen for minimum intensity modulation. The InGaAsP/InP quaternary materials are also used to operate the device in the 1.55 µm range.

Phase modulation is determined by a change $\Delta n_{eff}$ in the waveguide effective index. A change in the waveguide effective index $\Delta n_{eff}$ is related to the refractive index change $\Delta n$ of the MQW medium by $\Delta n_{eff} = \Gamma_{MQW} \Delta n$, where $\Gamma_{MQW}$ is the confinement factor of the unperturbed modal field in the QW layers. For a QCSE device, the value of $\Delta n$ is proportional to the square of the externally applied electric field F, and is known to fall off inversely with the energy detuning $\Delta U$, from the zero-field exciton resonance. The electro-optic behavior of the QCSE in multiple quantum wells can be evaluated by a parameter $\eta \equiv \Delta n \, \Delta U/F^2$. Once $\Delta n$ is known for the particular values of the electric field F and the energy detuning $\Delta U$, the parameter $\eta$ can give a rough prediction of $\Delta n$ magnitudes for other values of the electric field and the energy detuning. The maximum possible value of a modal-index change is limited. For example, if the index change is obtained by using the quantum-confined Stark effect (QCSE), then the maximum possible applied electric field must not exceed the ionization field of the excitons and the break-down field of the material system. The maximum field is limited by a need to keep the length of the device much shorter than the absorption length.

The intensity modulation is determined by the change in the waveguide absorption coefficient, $\alpha_{eff} = \Gamma_{MQW} \alpha$, with the applied electric field, where $\alpha$ is the absorption coefficient of the MQW medium. Having pure phase modulation is important since the adiabaticity of the DOS structure requires an elongated design. This further requires the operation at a relatively large detuning $\Delta U$ from the zero-field exciton resonance. At the same time in order to avoid large absorption loss, the device must be much shorter then the absorption length, $1/\alpha_{eff}$.

Figure 1D:
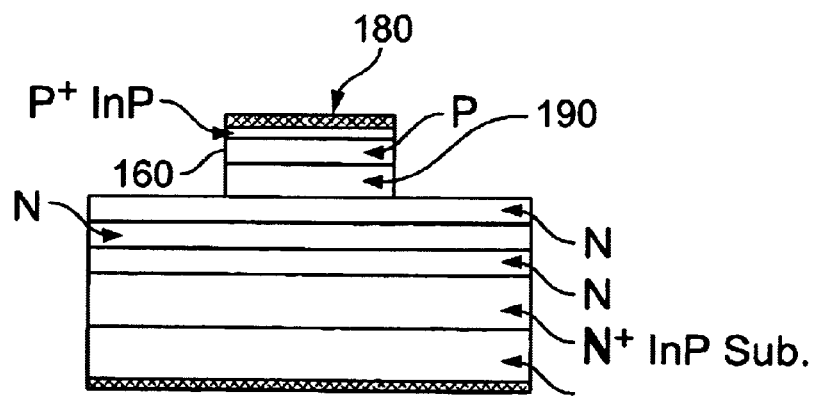
FIG. 1d is a part of a cross-sectional diagram of the embodiment of FIG. 1a along the lines B–B'.

The p-i(MQW)-n structure of the DOS rib waveguides is shown in FIG. 1d. The 0.51 µm MQW region consists of 30 periods of undoped $In_{0.64}Ga_{0.36}As_{0.77}P_{0.23}$/InP quantum wells each with an 85 Å barrier and well thickness. Since the thickness of each quantum well period is much smaller then the optical wavelength, the MQW region can be replaced by a single homogeneous layer with an equivalent refractive index $$n_{MQW} = \sqrt{\frac{m_w t_w n_w^2 + m_b t_b n_b^2}{m_w t_w + m_b t_b}}, \quad (11)$$

for the numerical calculations of the $E^x$ mode propagation. Here $(m_w, m_b)$, $(t_w, t_b)$, and $(n_w, n_b)$ are the number, thickness, and refractive index of the quantum well and the barrier regions, respectively. At a wavelength of $\lambda_{design}=1.55$ µm, the values of $n_w$ and $n_b$ used in the calculations are 3.4065 and 3.1631, respectively. This yields a value of $n_{MQW} \cong 3.287$. The composition of the $In_{0.85}Ga_{0.15}As_{0.32}P_{0.68}$ p-type and n-type confinement layers is chosen to give a homogeneous refractive-index distribution inside the rib-core region. In this case, the optical mode is not guided by the thin 0.51 µm MQW layer. This avoids modal mismatch at the 1×4 DOS branching point and, at the same time, allows for the design of a CMPS with a small multimode-waveguide width which is required to reduce the crosstalk in the single-mode/multi-mode backward coupler section.

The confinement factor, $\Gamma_{MQW}$, in the QW layers is given by $$\Gamma_{MQW} = \Gamma_{eq} \frac{m_w t_w}{m_w t_w + m_b t_b} \quad (12)$$

where $\Gamma_{eq} \cong 0.36$, is the confinement factor of the equivalent 0.51 µm homogeneous layer, and $\Gamma_{MQW} \cong 0.18$. The value of $\eta \cong 3 \times 10^{-5}$ (meV) cm² (kV)$^{-2}$ was empirically calculated for similar InGaAsP/InP MQW's and has approximately the same value in other III-V MQW's. In this design, the energy detuning from the zero-field exciton resonance was estimated to be $\Delta U \cong 120$ meV based on the compositional change of the QW layer compared to the previously reported InGaAsP/InP MQW's that have the same QW width. This results in an effective index change of $\Delta n_{eff} \cong 45 \times 10^{-9}$ F² (kV/cm). The small change in the value of $\Delta U$ ($\cong 1.8$ meV) due to the different $\lambda$'s of the WDM channels is neglected.

Since the actual device is designed for $E^x$ mode operation, a 2D BPM simulation based on the effective index method is carried out for the TM polarization with the value of $N_F=3.254$, and $N_L=3.235$ for the core and cladding refractive indices, respectively. n the first design approach, the structure is both symmetrical and adiabatical. Hence, numerical calculations are needed for only 12 permutations out of the total possible 24 permutations. In the second design approach, numerical calculations for all 24 permutations are needed. The crosstalk values for these permutations are calculated with different voltage distributions for an assumed overall DOS length of 15 mm with linearly tapered output-waveguide widths of 2–2.6 µm, a tapered-electrode-section length of 5 mm, and an inner and outer output-waveguides edge-to-edge separation of 3.6 µm and 16.9 µm, respectively. The maximum value of the effective index change, 0.002, used in these calculations corresponds to an electric field of $\cong 211$ kV/cm. This maximum value of electric field is reasonable given that the exciton resonance can still be resolved with a wider 94 Å quantum well width at values of electric field as high as $\cong 220$ KV/cm.

The simulation results for the first design approach are shown in the following table:

TABLE A

| Channel Distribution | Voltage Distribution | DOS Crosstalk (dB) | CMPS Crosstalk (dB) |
|---|---|---|---|
| 1 4321 | V0 V4 V8 V9 | <−19.64 | <−18.90 |
| 2 4312 | V0 V2 V9 V8 | <−20.58 | <−19.93 |
| 3 4231 | V0 V6 V3 V9 | <−20.84 | <−20.47 |
| 4 4213 | V0 V8 V9 V3 | <−19.45 | <−18.74 |
| 5 4132 | V0 V9 V5 V8 | <−20.77 | <−19.83 |
| 6 4123 | V0 V9 V7 V4 | <−21.3 | <−20.252 |
| 7 3421 | V2 V0 V8 V9 | <−18.89 | <−18.65 |
| 8 3412 | V1 V0 V9 V8 | <−18.26 | <−17.87 |
| 9 3241 | V2 V5 V0 V9 | <−21.13 | <−20.07 |
| 10 3142 | V2 V6 V0 V4 | <−20.71 | <−20.35 |
| 11 2431 | V7 V0 V3 V9 | <−20.15 | <−19.56 |
| 12 2341 | V4 V3 V0 V9 | <−18.82 | <−18.20 | where V0=−1.2V, V1=2.94V, V2=3.58V, V3=4.66V, V4=5.58V, V5=6.38V, V6=7.1V, V7=7.77V, V8=8.39V, V9=9.53V. The results show a worst case crosstalk value of −18.26 dB. The crosstalk values for 0.3 µm tolerance in the input width of the tapered electrodes are better then −17.8 dB.

The simulation results for the second design approach, where only even-ordered modes are excited are shown in the following tables:

TABLE B

| Channel Distribution | Voltage Distribution | DOS Crosstalk (dB) |
|---|---|---|
| 1 4321 | V0 V6 V10 V15 V12 V8 V4 | <−24.9 |
| 2 4312 | V0 V4 V17 V12 V1 V8 V15 | <−23.43 |
| 3 4231 | V0 V6 V5 V17 V13 V6 V2 | <−23.69 |
| 4 4213 | V0 V10 V15 V6 V4 V8 V12 | <−24.98 |
| 5 4132 | V0 V15 V8 V11 V13 V9 V2 | <−24.93 |
| 6 4123 | V0 V17 V12 V8 V6 V10 V15 | <−26.33 |
| 7 3421 | V3 V0 V15 V17 V16 V8 V1 | <−23.05 |
| 8 3412 | V3 V0 V17 V14 V1 V9 V16 | <−24.09 |
| 9 3241 | V4 V7 V0 V17 V1 V5 V16 | <−24.41 |
| 10 3214 | V8 V12 V17 V0 V15 V10 V4 | <−25.81 |
| 11 3142 | V6 V15 V0 V10 V12 V8 V4 | <−24.88 |
| 12 3124 | V6 V15 V10 V0 V12 V8 V4 | <−25.16 |

TABLE C

| Channel Distribution | Voltage Distribution | DOS Crosstalk (dB) |
|---|---|---|
| 1 2431 | V6 V0 V2 V17 V12 V5 V1 | <−23.35 |
| 2 2413 | V10 V0 V15 V6 V4 V8 V12 | <−24.30 |
| 3 2341 | V5 V2 V0 V17 V12 V4 V1 | <−24.33 |
| 4 2314 | V11 V9 V15 V0 V2 V10 V12 | <−24.19 |
| 5 2143 | V13 V17 V0 V4 V8 V15 V2 | <−26.48 |
| 6 2134 | V12 V15 V6 V0 V13 V9 V4 | <−25.13 |
| 7 1432 | V15 V0 V4 V6 V11 V5 V2 | <−26.38 |
| 8 1423 | V15 V0 V8 V6 V12 V7 V4 | <−24.29 |
| 9 1342 | V15 V6 V0 V10 V12 V8 V4 | <−24.31 |
| 10 1324 | V15 V7 V9 V0 V2 V8 V13 | <−26.05 |
| 11 1243 | V15 V11 V0 V4 V6 V12 V2 | <−23.53 |
| 12 1234 | V15 V10 V6 V0 V12 V8 V4 | <−26.18 | where $V0=-1.2V$, $V1=0.77V$, $V2=1.59V$, $V3=2.22V$, $V4=2.75V$, $V5=3.65V$, $V6=4.4V$, $V7=5.07V$, $V8=5.67V$, $V9=6.22V$, $V10=6.73V$, $V11=7.22V$, $V12=7.67V$, $V13=8.11V$, $V14=8.32V$, $V15=8.52V$, $V16=8.72V$, $V17=8.92V$. The results show a worst case crosstalk value of −23.05 dB.

As each multi-mode waveguide mode is directed to a different output waveguide 160, it accumulates a path loss. A small change in the path loss is required in the design of photonic switches. For 4×4 semiconductor switch arrays, variations in the path loss of 0.5 dB −2.6 dB have been reported. In the present invention, a reasonable change in path loss is expected given that a previously reported InGaAsP/InP MQW structure with a 120 Å quantum well width results in the same maximum Stark shift, $\sim F^2 t_w^4$, with applied electrical field of $\cong 106$ KV/cm. The measured change in absorption due to the change in the bias voltage of the 4-mm-long structure is negligible under comparable energy detuning and Stark shifts. This suggests smaller variations in the path loss with longer devices. Indeed, the roughness of the etched rib-waveguide core as well as the longer device can add more fabrication constraints in this case.

To estimate the driving voltage required for a given effective index change, $\Delta n_{\mathit{eff}}$, the doping concentration on either sides of the i-MQW layer is assumed to be high enough so that the intrinsic layer is fully depleted at zero bias, and the extension of the depletion region outside the intrinsic layer can be neglected. In this case, the electric field in the intrinsic layer $$F=V/d+F_o \tag{13a}$$

can be approximated with $$F_o=V_o/d, \tag{13b}$$

where d is the intrinsic layer width, and (V, $V_o$) are the magnitudes of the applied reverse bias voltage and the thermal equilibrium voltage, respectively. The thermal equilibrium voltage, $V_o$, corresponds to a difference in Fermi-energies on both sides of the intrinsic layer before contact. For example, if $N_A=N_D=10^{17}$ cm$^{-3}$, then $V_o \cong 1.2$ V which corresponds to $F_o \cong 24$ Kv/cm, and the maximum applied voltage required $\cong 9.5$V. The value of capacitance, C, of the p-i(MQW)-n structure is $\cong 5.4$ pf using the approximation, $C \cong \epsilon_r \epsilon_o A/d$, where A is the electrode area, $\epsilon_o$ is the permittivity in free space, and $\epsilon_r=12.35$ is the relative static dielectric constant. This corresponds to, 5 R $C_i$, switching time of $\cong 1.4$ nsec assuming a voltage source resistance of R=50 Ω.

It is important to note that the coupler-multiplexer permutation switch 100 uses unequally spaced channels. The input signal with different unequally spaced channels, is then phase-matched through the grating 150 to the different backward modes of the multi-mode waveguide 140 so that each channel power is coupled to the different mode of the multi-mode waveguide. This reduces a multi-wave mixing-(MWM-)induced crosstalk on long-haul optical communication.

Although the backward coupler 120 of the CMPS 100 is polarization sensitive, it is possible to accommodate both TE and TM polarizations by using an excitation symmetry of the device in addition to diversity reception. For example, output single-mode waveguides of a polarization splitter can symmetrically excite the multi-mode waveguide 140, allowing one set of single-mode waveguide parameters to satisfy the phase matching condition for TE modes and the other waveguide parameters to satisfy the phase-matching condition for TM modes at the same channel wavelengths. Alternatively, a plurality of gratings, in series or in parallel, can be used with one or more single-mode waveguides.

Figure 5:
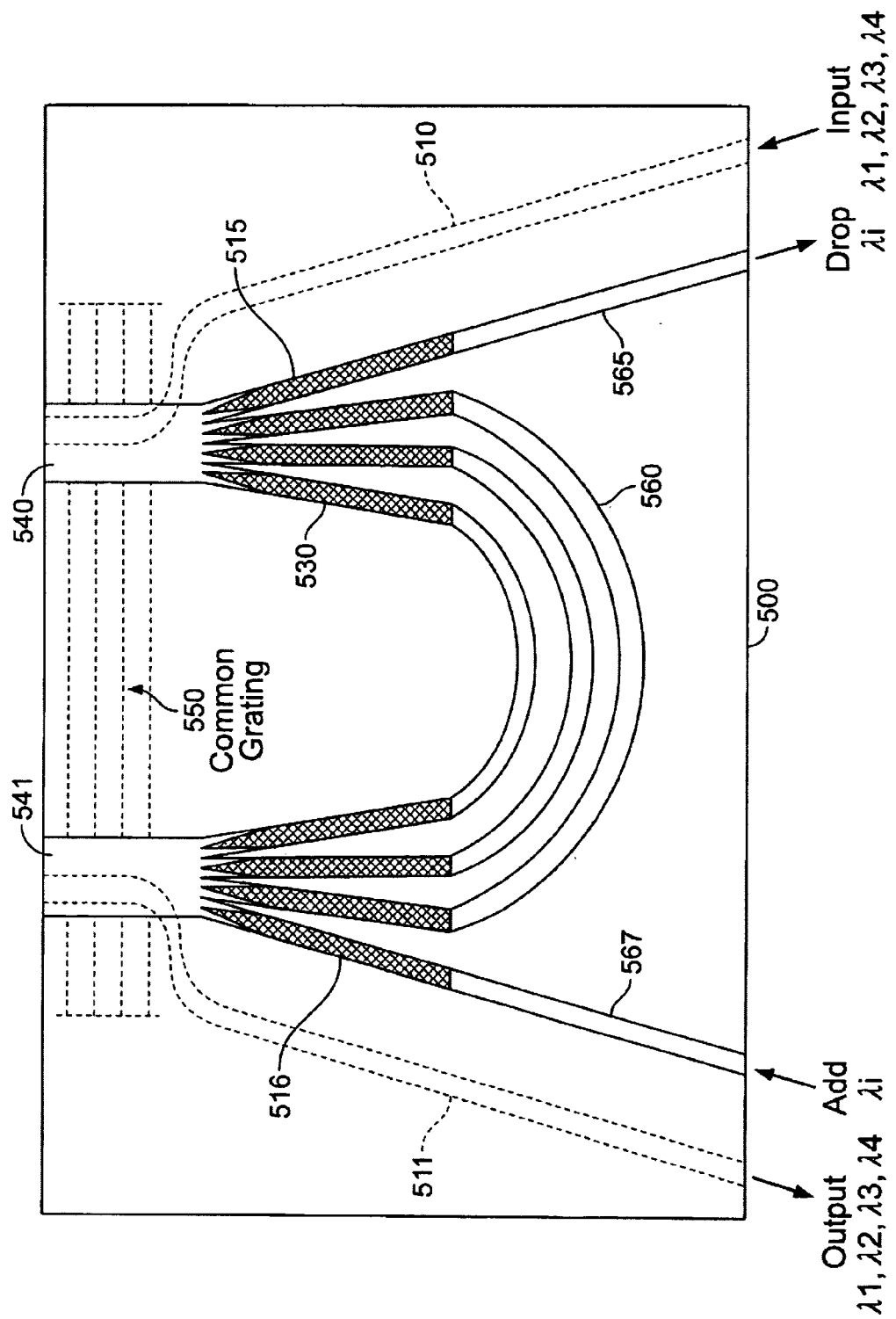
FIG. 5 is a schematic diagram an alternative embodiment of the present invention.

It is to be appreciated that other network configurations stand to benefit from the use of the present invention. Referring to FIG. 5, an exemplary add/drop multiplexer 500 is illustrated. The add/drop multiplexer 500 has a common grating 550 and it is fully integrated on a single substrate. This, in turn, minimizes the mismatch in device characteristics of a demultiplexer 515 and a multiplexer 516. A single mode input waveguide 510 is backward coupled to a multi-mode demultiplexer waveguide 540 through the common grating 550. A digital optical switch 530 separates and switches the modes so that a channel at wavelength $\lambda_i$ is directed to a drop output mode 565. Other channels are directed to demultiplexer output modes 560 and transmitted to the multiplexer 516, where a channel 567 at wavelength $\lambda_i$ is added. The modes are then backward coupled through a multi-mode waveguide 541 and the common grating to a single-mode output waveguide 511.

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly shown or described herein, embody the principles of the invention and are thus within the spirit and scope of the invention.

I claim:

1. A permutation switch for switching wavelength-division multiplexed signals received from one or more optical waveguides, comprising:
   (a) a substrate having at least one surface; and
   (b) a single-mode to multi-mode backward coupler, coupled to said surface of said substrate, for receiving single-mode wavelength division multiplexed signals from said one or more optical waveguides, and for backward coupling said signals into a plurality of single-mode signals, each having its own unique mode;

wherein said single-mode to multi-mode backward coupler further comprises:
- (a) a receiving layer, coupled to said substrate surface, for receiving said single-mode wavelength-division multiplexed signals;
- (b) a separation layer having a first surface and a second surface, said first surface coupled to said receiving layer, for permitting said backward coupling between said single-mode wavelength-division multiplexed signal and said plurality of single-mode signals; and;
- (c) a multi-mode waveguide, coupled to said second surface of said separation layer, for receiving said backward coupled plurality of single-mode signals.

2. The switch of claim 1, wherein said multi-mode waveguide is adapted to receive all of said backward coupled signals in even-ordered modes.

3. The switch of claim 1, wherein said separation layer further comprises a grating portion etched into said second surface of said separation layer, for phase-matching a channel of said wavelength-division multiplexed signal to one of said plurality of single-mode signals.

4. The switch of claim 3, wherein said multi-mode waveguide further comprises a grating etched into a surface thereof for phase-matching a channel of said wavelength-division multiplexed signal to one of said plurality of single-mode signals, wherein said grating is coupled to said second surface of said separation layer.

5. The switch of claim 1, wherein said wavelength division multiplexed signals comprise asynchronous signals.

6. The switch of claim 1, wherein said single-mode signals comprise asynchronous signals.

7. The switch of claim 1, wherein said separation layer is adapted to minimize a modal-field overlap.

8. The switch of claim 1, wherein said single-mode to multi-mode backward coupler further comprises a plurality of output waveguides, each coupled to said multi-mode waveguide and receiving one of said plurality of single-mode signals.

9. The switch of claim 8, wherein said plurality of output waveguides are distributed adiabatically.

10. The switch of claim 8, further comprising a plurality of electrodes, each one mounted on one of said plurality of output waveguides.

11. The switch of claim 15, wherein said plurality of electrodes are tapered.

12. The switch of claim 1, wherein said receiving layer further includes an inverted rib portion having a predetermined width for propagating said single-mode wavelength division multiplexed signals.

13. The switch of claim 10, wherein said multi-mode waveguide further includes a rib portion having a predetermined width, and wherein said predetermined width of said inverted rib of said receiving layer is less than said predetermined width of said rib of said multi-mode waveguide.

14. The switch of claim 13, wherein said inverted rib portion of said receiving layer is offset from said rib portion of said multi-mode waveguide.

15. The switch of claim 13, wherein inverted rib portion of said receiving layer is aligned with an edge of said rib portion of said multi-mode waveguide.

16. The switch of claim 1, wherein each of said output waveguides further includes a multiple-quantum well layer.

17. The switch of claim 13, wherein said multiple quantum well layer comprises InGaAsP/InP.

18. The switch of claim 14, wherein each of said plurality of output waveguides are sized to be much smaller than corresponding absorption lengths.

19. The switch of claim 1, wherein said multi-mode layer is adapted to receive all of said backward coupled signals in sequential modes.

20. An add/drop multiplexer system for adding and dropping unequally spaced channels of a single-mode waveguide, comprising:
- (a) a substrate having at least a first surface;
- (b) a plurality of single-mode waveguides having unequally spaced channels mounted on said first surface;
- (c) a common single-mode to multi-mode waveguide grating-assisted backward-coupler, mounted on said first surface of said substrate and optically coupled to each of said plurality of single-mode waveguides; and
- (d) a plurality of digital optical switches, each having a plurality of output waveguides, optically coupled with said plurality of single-mode waveguides.

* * * * *

UNITED STATES PATENT AND TRADEMARK OFFICE
CERTIFICATE OF CORRECTION

PATENT NO. : 7,212,712 B2
APPLICATION NO. : 09/838862
DATED : April 20, 2001
INVENTOR(S) : Ramadan et al.

It is certified that error appears in the above-identified patent and that said Letters Patent is hereby corrected as shown below:

ON THE TITLE PAGE:

Item (75) Inventors:

Please insert --Richard Osgood, Jr., Chappaqua, NY
Robert S. Scarmozzino, Cortlandt Manner, NY--

Item (56) References Cited; under "OTHER PUBLICATIONS,"

Title Page, Column 2, line 11: should read --Communication-- instead of "Communications"

Page 2, Column 1, lines 25-28: delete entirety (duplicate references)

Page 3, Column 2, lines 10-34: delete entirety (duplicate references)

Insert --T.A. Ramadan et al., "A Novel 1 × 4 Coupler-Multiplexer Permutation Switch for WDM Applications", J. Lightwave Technol., Vol. 18, No. 4, pp.579-88, 2000--

IN THE CLAIMS:

Column 17, line 25 (claim 4, line 1) should read --claim 1-- instead of "claim 3"

Column 18, line 1 (claim 11, line 1) should read --claim 10-- instead of "claim 15"

UNITED STATES PATENT AND TRADEMARK OFFICE
CERTIFICATE OF CORRECTION

PATENT NO. : 7,212,712 B2
APPLICATION NO. : 09/838862
DATED : April 20, 2001
INVENTOR(S) : Ramadan et al.

It is certified that error appears in the above-identified patent and that said Letters Patent is hereby corrected as shown below:

Column 18, line 20 (claim 17, line 1) should read --claim 16-- instead of "claim 13"

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,212,712 B2 |
| APPLICATION NO. | : 09/838862 |
| DATED | : May 1, 2007 |
| INVENTOR(S) | : Tarek A. Ramadan |

Page 1 of 1

It is certified that error appears in the above-identified patent and that said Letters Patent is hereby corrected as shown below:

Column 1, line 6, please insert the following header and paragraph:

--Statement Regarding Federally Sponsored Research or Development
This invention was made with government support under grant number F49620-99-1-0038 awarded by the Air Force Office of Scientific Research. The government has certain rights in the invention.--

Signed and Sealed this

Thirteenth Day of November, 2012

David J. Kappos
*Director of the United States Patent and Trademark Office*